(12) United States Patent
Lee et al.

(10) Patent No.: US 10,917,368 B2
(45) Date of Patent: Feb. 9, 2021

(54) METHOD AND APPARATUS FOR PROVIDING SOCIAL NETWORK SERVICE

(71) Applicant: OFFICIAL MOBILE APPLICATIONS, INC., Tenafly, NJ (US)

(72) Inventors: Hagen Lee, Tenafly, NJ (US); Sang Won Moon, Bucheon-si (KR)

(*) Notice: Subject to any disclaimer, the term of this patent is extended or adjusted under 35 U.S.C. 154(b) by 67 days.

(21) Appl. No.: 16/047,618

(22) Filed: Jul. 27, 2018

(65) Prior Publication Data
US 2018/0359202 A1    Dec. 13, 2018

Related U.S. Application Data

(63) Continuation of application No. 15/124,232, filed as application No. PCT/KR2015/001979 on Mar. 2, 2015, now abandoned.
(Continued)

(51) Int. Cl.
*H04L 12/58* (2006.01)
*H04L 12/00* (2006.01)
(Continued)

(52) U.S. Cl.
CPC ......... *H04L 51/046* (2013.01); *G06Q 10/107* (2013.01); *G06Q 50/01* (2013.01);
(Continued)

(58) Field of Classification Search
CPC ..... H04L 51/046; H04L 67/306; H04L 51/32; H04W 12/0013; H04W 4/21; H04W 12/02
See application file for complete search history.

(56) References Cited

U.S. PATENT DOCUMENTS

| 2003/0037110 A1* | 2/2003 | Yamamoto | H04M 3/5322 709/204 |
| 2007/0073823 A1 | 3/2007 | Cohen et al. | |

(Continued)

FOREIGN PATENT DOCUMENTS

| KR | 102001005005 A | 2/2001 |
| KR | 1020050050323 A | 5/2005 |

(Continued)

OTHER PUBLICATIONS

Tsetserukou et al., "Affective haptics in emotional communication," 2009 3rd International Conference on Affective Computing and Intelligent Interaction and Workshops Year: 2009 | Conference Paper | Publisher: IEEE.*
(Continued)

*Primary Examiner* — Roderick Tolentino
(74) *Attorney, Agent, or Firm* — John H. Choi & Associates

(57) ABSTRACT

A social network service, which can visualize and express a user's emotions or opinions and can randomly arrange or permanently delete the content of conversations exchanged between the user and counterparts includes: receiving a chat room creation request from at least one user equipment; transmitting information on a user equipment that has transmitted a chat room participation request, among at least one other user equipment located within a predetermined distance from the user equipment that has transmitted the chat room creation request, to the user equipment that has transmitted the chat room creation request; and creating a chat room for allowing the user equipment that has transmitted the chat room creation request and at least one other user equipment that has transmitted a chat room participation request to perform messaging communication.

17 Claims, 20 Drawing Sheets

Related U.S. Application Data

(60) Provisional application No. 61/949,424, filed on Mar. 7, 2014.

(51) Int. Cl.

| | | |
|---|---|---|
| *H04W 4/21* | (2018.01) | |
| *G06Q 10/10* | (2012.01) | |
| *G06Q 50/00* | (2012.01) | |
| *H04W 12/00* | (2021.01) | |
| *H04L 29/06* | (2006.01) | |
| *H04L 29/08* | (2006.01) | |
| *H04W 12/02* | (2009.01) | |

(52) U.S. Cl.
CPC .......... *H04L 51/32* (2013.01); *H04L 63/0428* (2013.01); *H04L 67/306* (2013.01); *H04W 4/21* (2018.02); *H04W 12/0013* (2019.01); *H04W 12/02* (2013.01)

(56) References Cited

U.S. PATENT DOCUMENTS

| | | | | |
|---|---|---|---|---|
| 2009/0177978 A1* | 7/2009 | Hagale | ................ | G06Q 10/107 715/753 |
| 2012/0198233 A1* | 8/2012 | George | ................ | H04L 51/34 713/168 |
| 2013/0091214 A1* | 4/2013 | Kellerman | ............ | G06Q 10/00 709/204 |
| 2013/0132489 A1* | 5/2013 | Huang | ................ | H04L 67/18 709/206 |
| 2014/0189005 A1* | 7/2014 | Dinh-Trong | ........ | H04L 65/1069 709/204 |
| 2014/0223462 A1* | 8/2014 | Aimone | ............... | A61B 5/0476 725/10 |
| 2015/0052462 A1* | 2/2015 | Kulkarni | ............. | G06F 3/04817 715/765 |
| 2015/0149925 A1* | 5/2015 | Weksler | ................ | H04L 51/046 715/752 |
| 2015/0172395 A1* | 6/2015 | Jackson | .................. | H04L 67/18 709/204 |

FOREIGN PATENT DOCUMENTS

| | | |
|---|---|---|
| KR | 1020100095225 A | 8/2010 |
| KR | 1020120129888 A | 11/2012 |
| WO | 2011084707 A2 | 7/2011 |

OTHER PUBLICATIONS

Munezero et al. "Are They Different? Affect, Feeling, Emotion, Sentiment, and Opinion Detection in Text," IEEE Transactions on Affective Computing Year: 2014 | vol. 5, Issue: 2 | Journal Article | Publisher: IEEE.*

International Search Report of PCT/KR2015/001979, dated May 28, 2015.

English translation of the International Search Report of PCT/KR2015/001979, dated May 28, 2015.

Written Opinion of PCT/KR2015/001979, dated May 28, 2015.

International Preliminary Report on Patentability of PCT/KR2015/001979, dated Sep. 13, 2016.

* cited by examiner

METHOD AND APPARATUS FOR PROVIDING SOCIAL NETWORK SERVICE

This application is a continuation of U.S. application Ser. No. 15/124,232, which is a national stage application of PCT/KR2015/001979, filed Mar. 2, 2015, which claims priority to U.S. Provisional Application No. 61/949,424, filed on Mar. 7, 2014, which are incorporated by reference in their entireties.

TECHNICAL FIELD

The present disclosure relates to the field of Social Network Service (SNS), and particularly, to a method and apparatus for providing a social network service, which can visualize and express user's emotions or opinions and can randomly arrange or permanently delete the content of conversation exchanged between the user and a counterpart.

BACKGROUND

Social Network Service (SNS) means an online platform which forms and strengthens social relations through free communication, information sharing, expansion of human network and the like among users. Most of SNSs are web-based services and provide a means for making contact with each other among the users through an e-mail or an instant messenger service.

An SNS application may provide services such as transfer of pictures, moving images and positions of the users and the like, and a user of the SNS application may communicate an intention to a counterpart using text. In addition, the user of the SNS application may confirm in real-time whether or not the counterpart has read a message, synchronize counterparts registered in a phone book of a cellular phone with a chatting counterpart list of the SNS application, and replace a background screen of a chat window with photos or pictures. Further, the user of the SNS application may communicate an emotion of the user to the counterpart in a chat room by inputting emoticons instead of text.

A procedure of providing an SNS service using the SNS application is as follows. The SNS application provides the user with the chatting counterpart list. If the user selects a counterpart that the user desires to chat with from the chatting counterpart list, a chat room screen is displayed. The user may additionally invite another chatting counterpart on the chat room screen; and if another chatting counterpart is not added, the user may perform one-to-one chatting with the initially selected counterpart, and if another chatting counterpart is added, the user may perform group chatting. The user inputs text or emoticons on the chat room screen to communicate text or emoticons to the counterpart.

Recently, leakage of personal information is emerging as an issue, wherein since a conventional SNS application records all of transmitted and received contents of a conversation from beginning to end, a serious infringement of privacy may occur if the contents of conversation are leaked. Furthermore, since the conventional SNS application communicates an intention by using text or emoticons, there is a problem in that an emotion of the user may not be expressed specifically. That is, since an emotion of the user is expressed using only limited emoticons or extremely limited buttons, an accurate and detailed emotion of the user may not be expressed. Since the expression of an emotion is an input of emoticons or text containing an intention of the user, there is a problem in that a content different from actual emotional and biological conditions may be selected so that an inaccurate emotion may be delivered to the counterpart. Further, since an emotion of the user is expressed using pre-formed emoticons and words, only a simple intention of the user is delivered.

SUMMARY

The present disclosure provides a method and apparatus for providing a social network service, which can visualize and express user's emotions or opinions and can randomly arrange or permanently delete the content of conversation exchanged between the user and a counterpart.

A Social Network Service (SNS)-providing method according to the present disclosure, including: a) receiving a chat room creation request from at least one user equipment; b) transmitting information on a user equipment that has transmitted a chat room participation request, among at least one other user equipment located within a predetermined distance from the user equipment that has transmitted the chat room creation request, to the user equipment that has transmitted the chat room creation request; and c) creating a chat room for allowing the user equipment that has transmitted the chat room creation request and at least one other user equipment that has transmitted a chat room participation request to perform messaging communication.

Further, a Social Network Service (SNS)-providing method according to the present invention, comprising: a) by a user equipment, requesting creation of a chat room; b) receiving, from a server, information on at least one other user equipment located within a predetermined distance from the user equipment and displaying the received information on the user equipment; and c) creating the chat room together with a user equipment that has transmitted a chat room participation request among the at least one other user equipment, to enable messaging communication with the user equipment.

Further, a Social Network Service (SNS)-providing apparatus includes a reception part for receiving a chat room creation request from at least one user equipment; and a processor for transmitting information on a user equipment that has transmitted a chat room participation request, among at least one other user equipment located within a predetermined distance from the user equipment that has transmitted the chat room creation request, to the user equipment that has transmitted the chat room creation request, and for creating the chat room so that the user equipment that has transmitted the chat room creation request and at least one other user equipment that has transmitted a chat room participation request may perform messaging communication.

According to the present disclosure, a user can effectively express and communicate an emotional condition of the user by using a social network service and easily and conveniently make use of the social network service, and protection of privacy of SNS users can be reinforced.

DETAILED DESCRIPTION

Hereinafter, embodiments of the present disclosure will be described in detail with reference to the accompanying drawings. However, in the following description, detailed explanation of well-known functions or configurations will be omitted if it may unnecessarily make the subject matter of the present disclosure unclear.

Figure 1:
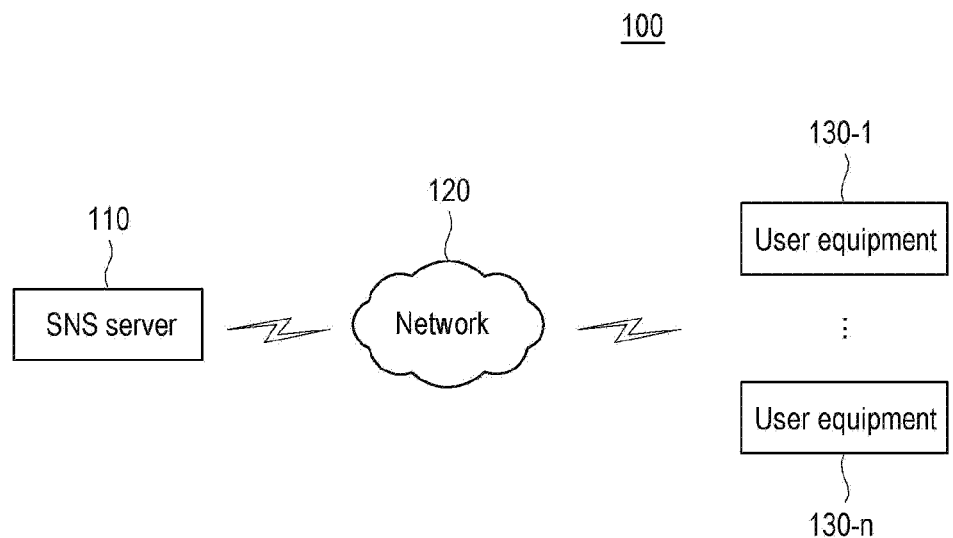
FIG. 1 is a view showing an environment for providing a social network service according to an embodiment of the present disclosure.

FIG. 1 is a view showing an environment for providing a social network service according to an embodiment of the present disclosure.

As shown in FIG. 1, an environment 100 for providing a social network service (SNS) may include an SNS server 110, a network 120 and a plurality of user equipments 130-1 to 130-n. Although not shown in the figure, an SNS providing apparatus may include the SNS server 110.

The SNS server 110 may transmit and receive signals to and from the user equipments 130-1 to 130-n connected through the network 120 to drive and operate an SNS application and relay transmission and reception of messaging signals among the user equipments 130-1 to 130-n. That is, the SNS server 110 may receive a request for the SNS application and data needed for driving and operating the SNS application from a specific user equipment (e.g., 130-1) and transmit the SNS application and data needed for driving and operating the SNS application to the corresponding user equipment 130-1. In addition, the SNS server 110 may receive and store position information from the user equipments 130-1 to 130-n, receive a chat room creation request from a specific user equipment (e.g., 130-1), and transmit information on user equipments 130-n located within a predetermined distance (e.g., 1 km, 10 km, 100 km, 200 km or the like) from the user equipment 130-1, which has transmitted the chat room creation request, to the user equipment 130-1 that has transmitted the chat room creation request. In one embodiment, the SNS server 110 may receive the position information from the user equipments 130-1 to 130-n using a mobile communication network such as a Global Positioning System (GPS), Wi-Fi, 3G, 4G or the like when an SNS application is driven in the user equipments 130-1 to 130-n or when a menu, i.e., an Instant Grouping Menu, for creating a chat room based on the position of a user equipment is driven. In addition, the SNS server 110 may create the chat room in which messaging signals can be transmitted and received and which include user equipments that have transmitted a chat room creation request and the user equipments that have transmitted the chat room participation request, so that a specific user equipment 130-1 may transmit a messaging signal to a user equipment (e.g., 130-n) used by at least one user to which the user equipment 130-1 intends to transmit the corresponding messaging signal. Further, the SNS server 110 may receive a chat room participation request from a plurality of user equipments 130-n, transmit information on user equipments 130-n located within a predetermined distance (e.g., 1 km, 10 km, 100 km, 200 km or the like) from the user equipment 130-1 that has transmitted the chat room creation request to the user equipment 130-1, and create the chat room in which messaging signals may be transmitted and received among the user equipments that have transmitted the chat room participation request. The detailed configuration and functions of the SNS server 110 will be described below.

The network 120 may relay transmission and reception of signals for providing an SNS between the SNS server 110 and the user equipments 130-1 to 130-n. In one embodiment, the network 120 may include a wireless communication network such as a mobile communication network, a local area network (LAN), a wide area network (WAN) or the like; a wired communication network such as the Internet or the like; and a near field communication network such as Bluetooth, Zigbee, Wi-Fi or the like, but are not limited thereto.

The user equipments 130-1 to 130-n may receive the chat room creation request or the chat room participation request from users and transmit the chat room creation request or the chat room participation request to the SNS server 110. Further, the user equipments 130-1 to 130-n may receive an input, such as text, an image, a moving image, an emotional condition of the users, an opinion of the users or the like, from the users; generate a messaging signal based on the input; and transmit the generated messaging signal to the SNS server 110 through the network 120. Further, the user equipments 130-1 to 130-n may display text, an image, a moving image, an emotional condition of the users, an opinion of the users or the like included in the corresponding messaging signal on the display (see "390" of FIG. 4) of the user equipments 130-1 to 130-n using the messaging signal received from other user equipments 130-1 to 130-n through the server 110 and the network 120. In one embodiment, the user equipments 130-1 to 130-n may include a cellular phone such as a smart phone or the like, a personal computer, a terminal dedicated to chatting, and the like. However, the user equipments 130-1 to 130-n may be any apparatus including input devices and output devices and so far as it may communicate with the SNS server 110. The detailed configuration and functions of the user equipment 130-n will be described below.

Figure 2:
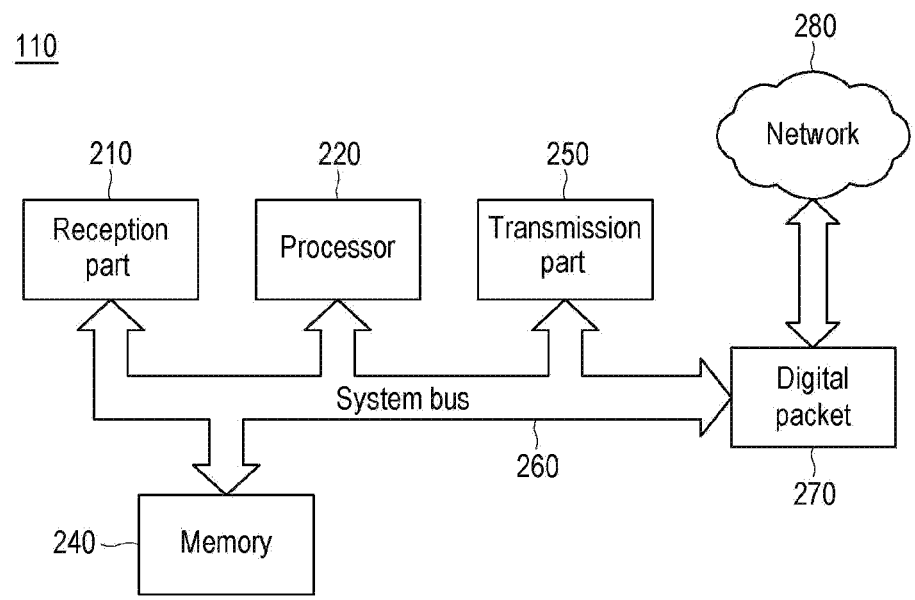
FIG. 2 is a view showing a configuration of a server according to an embodiment of the present disclosure.

FIG. 2 is a view showing a configuration of the server according to an embodiment of the present disclosure.

As shown in FIG. 2, the SNS server 110 may include a reception part 210, a processor 220, a memory 240, a transmission part 250 and a system bus 260. In one embodiment, the reception part 210, the processor 220, the memory 240 and the transmission part 250 may be connected to one another using the system bus 260.

The reception part 210 may receive a signal for driving and operating the SNS application, the chat room creation request, the chat room participation request, the SNS message and the like from the user equipment 130-n through the network 120, in the form of a digital packet 270, and transmit the received signal to the processor 220.

If the reception part 210 receives the signal for driving and operating the SNS application, the chat room creation request or the chat room participation request transmitted from the user equipment 130-1, the processor 220 may store the received signal in the memory 240 and create data, which are needed to drive and operate the SNS application or to create the SNS chat room in the user equipment 130-n, in the form of the digital packet 270. Further, when the processor 220 receives the SNS message from the reception part 210, the processor 220 may perform signal processing needed for the corresponding SNS message and form the SNS message into a digital packet 270 format.

The transmission part 250 may receive the digital packet 270 formed by the processor 220 and transmit the corresponding digital packet 270 through the network 120 to the user equipment 130-n to which the digital packet is required to be transmitted, using an IP address of the destination.

Figure 3:
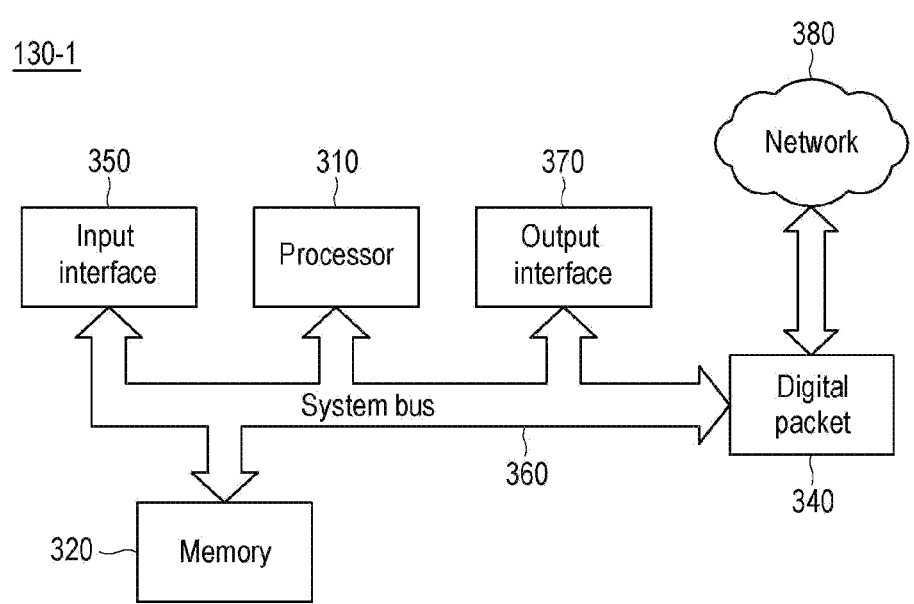
FIG. 3 is a view showing a configuration of a user equipment according to an embodiment of the present disclosure.

FIG. 3 is an exemplary view showing a configuration of the user equipment according to an embodiment of the present disclosure.

As shown in FIG. 3, the user equipment 130-1 may include a processor 310, a memory 320, an input interface 350, a system bus 360 and an output interface 370. In one embodiment, the processor 310, the memory 320, the input interface 350 and the output interface 370 may be connected to one another through the system bus 360.

The user equipment 130-1 may further include the input interface 350 and may receive instructions, data, a chat room creation request, a chat room participation request or the like therethrough. Various input devices may be connected to the input interface 350, and the input devices may include an electronic digitizer, a microphone, a pointing device generally referred to as a keyboard or a mouse, a trackball or a touch pad, a joystick, a gamepad, a satellite dish, a scanner and the like, but are not limited thereto. The input interface 350 is a part of a program interacting to exchange information between the user equipment 130-1 and a user and may receive a user request to generate an app driving signal for driving the SNS application and to generate a messaging signal for transmitting various messages including the text, the image, the moving image, the emotional condition of the user, an intention of the user and the like to a counterpart.

The processor 310 may perform control to receive the app driving signal from the input interface 350, to retrieve an SNS application 334 and data 336 for driving the SNS application from the memory 320, to drive the SNS application and to output the driven SNS application through the output interface 370.

Further, the processor 310 may receive the chat room creation request or the chat room participation request from the user through the input interface 350 and transmit the chat room creation request or the chat room participation request in the form of a digital packet 340. In addition, the processor 310 may receive a messaging signal from the input interface 350, generate various types of SNS messages including the text, the image, the moving image, the emotional condition of the user, the intention of the user and the like included in the messaging signal, and transmit the SNS message in the form of the digital packet 340. The various types of SNS messages generated by the processor 310 will be described below. Furthermore, the processor 310 may control the output interface 370 to display the text, the image, the moving image, the emotional condition of the user, the intention of the user and the like included in a corresponding SNS message to the user through the output interface 370 using the SNS message received in the form of the digital packet 340 from the SNS server 110 through the network 120.

The memory 320 may store the SNS application 334 and the data 336 for driving and operating the SNS application and for creating the chat room. In one embodiment, the memory 320 may include those implemented in the form of Read Only Memory (ROM), Random Access Memory (RAM), Compact Disc ROM (CD-ROM), a magnetic tape, a floppy disk, an optical data storage device or a carrier wave (e.g., transmission over the Internet), but is not limited thereto.

The output interface 370 may display the SNS application driven by the processor 310 and display the content input by the user who has seen the displayed SNS application, through the input interface 350 on the SNS application in the form of an SNS message. Further, the output interface 370 may display information on the user equipments located within a predetermined distance based on a distance from the user equipment, which has transmitted the chat room creation request, to the corresponding user equipment by using the information received from the SNS server 110, display a profile (e.g., an image, a name or the like) of the users using the user equipments regardless of the distance, or display the information on the user equipments in the shape of dotted lines (see "DL" of FIG. 6). In addition, the output interface 370 may display various types of SNS messages received from a counterpart user through the network 120 on the screen. In one embodiment, the output interface 370 may include those implemented in the form of a Liquid Crystal Display (LCD), a Light Emitting Diode (LED) display, an Organic LED (OLED) display and the like, but is not limited thereto.

FIGS. 4 to 7 are views showing screens displayed on the user equipment when a location-based SNS chat room is created, according to an embodiment of the present disclosure.

Figure 4:
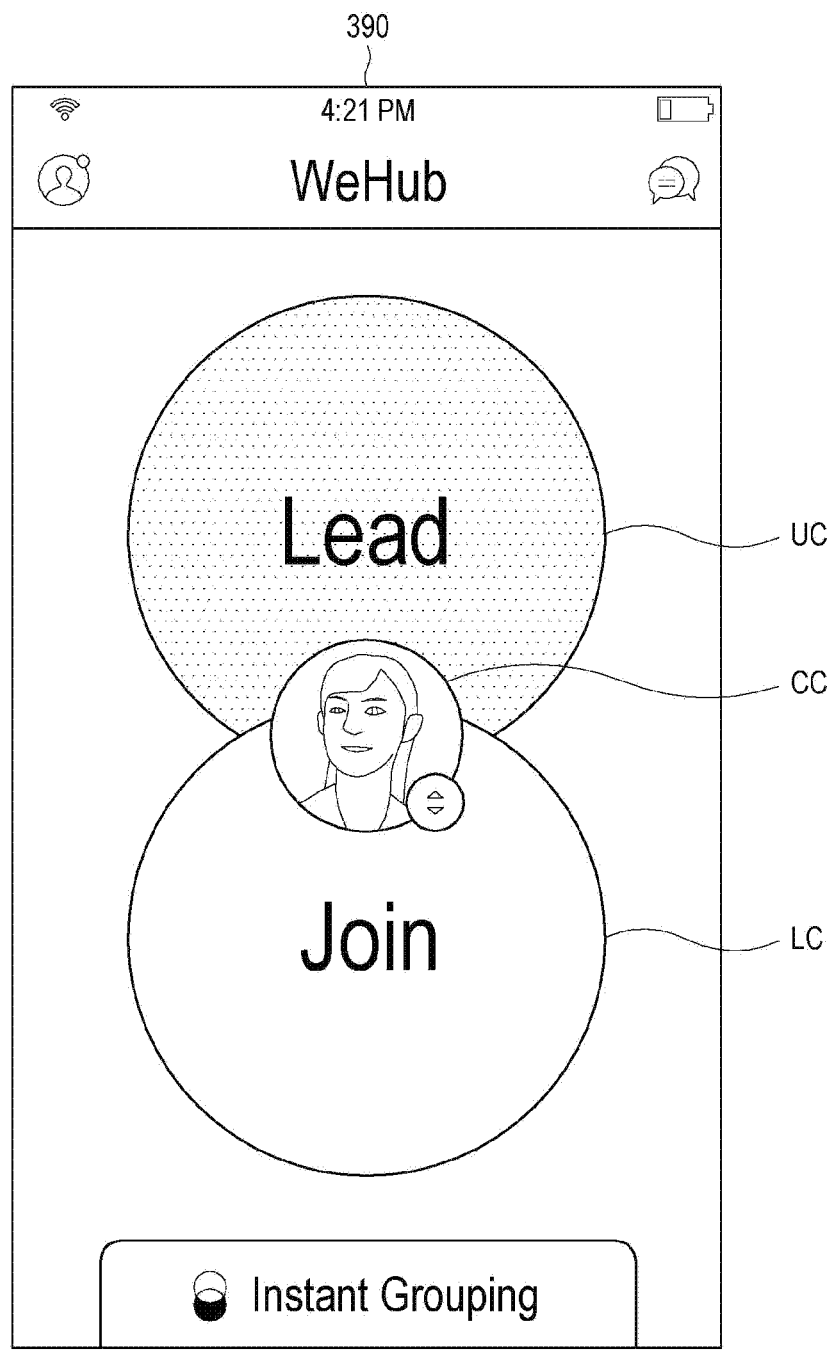
FIGS. 4 to 7 are views showing screens displayed on a user equipment when a location-based SNS chat room is created, according to an embodiment of the present disclosure.
Figure 5:
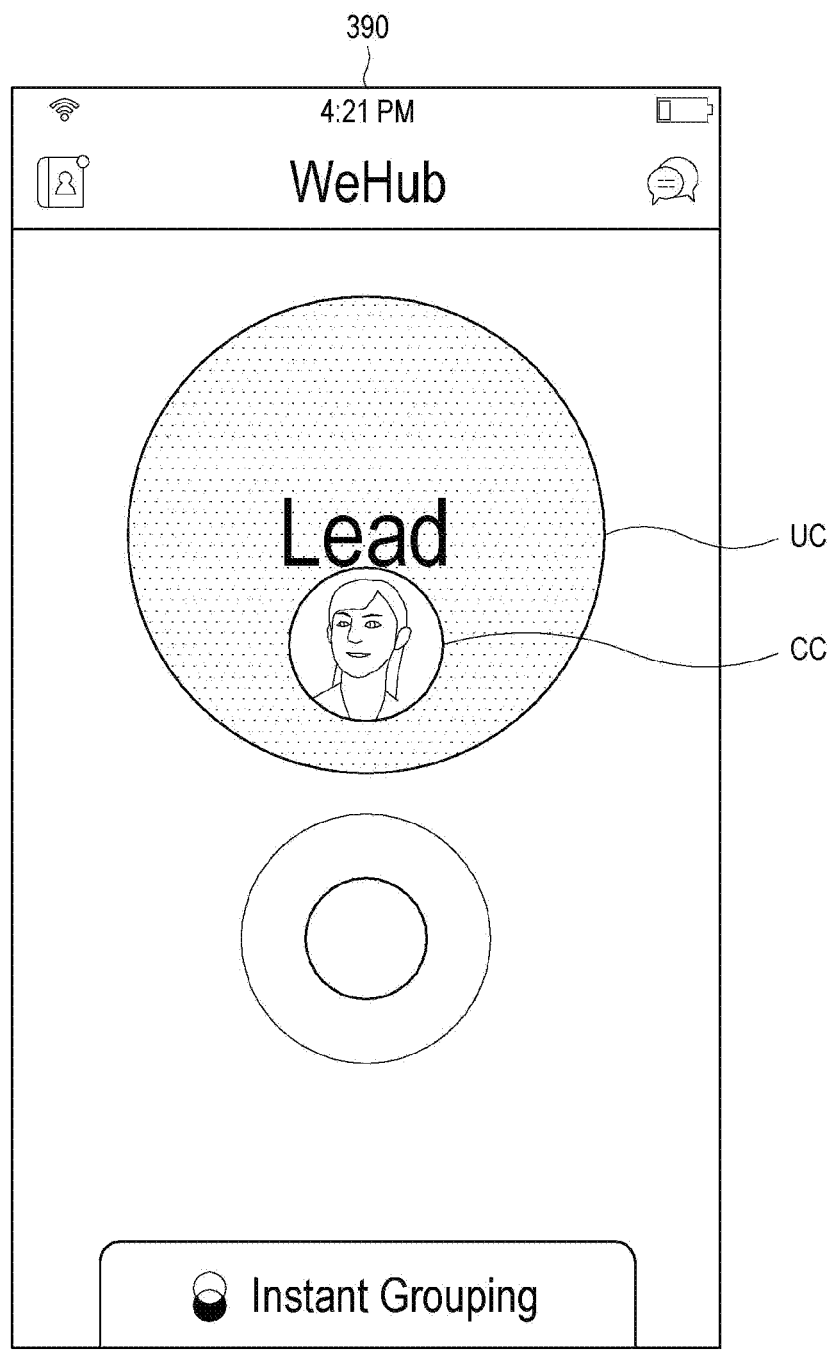
Figure 6:
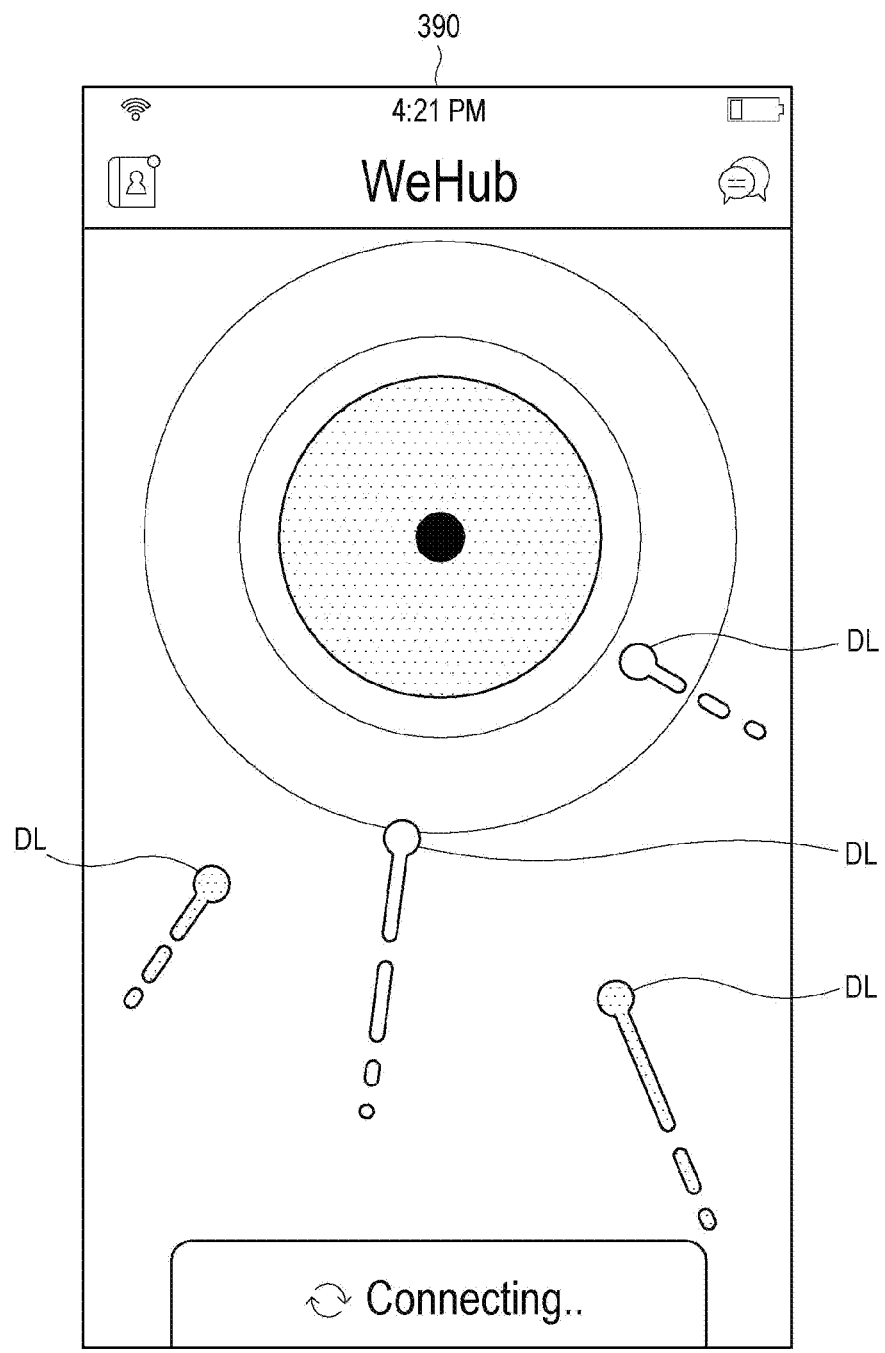
Figure 7:
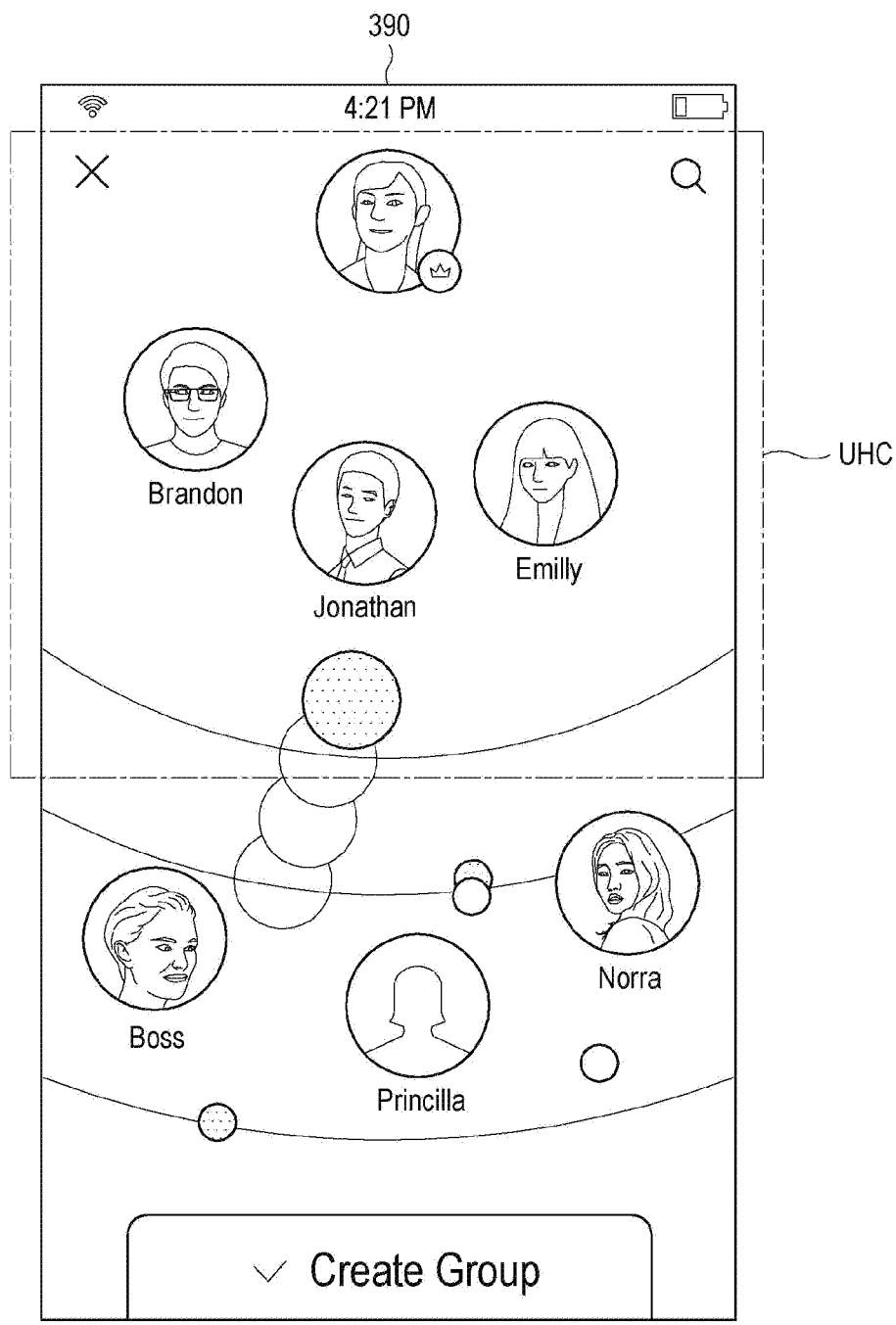

In one embodiment, when a menu (an Instant Grouping Menu) for creating the SNS chat room based on the position of the user equipment 130-1 is driven, the SNS server 110 may receive and store position information on a corresponding user equipment 130-1. Meanwhile, when the chat room creation request is received from the specific user equipment 130-1, the SNS server 110 may transmit information on other user equipments 130-n, which are located within a predetermined distance (e.g., 1 km, 10 km, 100 km, 200 km or the like) from the user equipment 130-1, to the user equipment 130-1. In one embodiment, a user interface consisting of three circles UC, CC and LC as shown in FIG. 4 may be displayed on the output interface 370 of the user equipment 130-1 that has selected the Instant Grouping Menu, and the user may transmit the chat room creation request to the SNS server 110 by moving the circle CC in the middle of the display 390 into the upper circle UC indicated as "Lead" while touching the circle CC (by 'drag and drop') as shown in FIG. 5. In addition, the SNS server 110 may inquire other user equipments 130-n located within a predetermined distance from the user equipment 130-1 whether or not to participate in the chat room, and a user who desires to participate in the chat room may transmit the chat room participation request to the SNS server 110. In one embodiment, a user interface consisting of three circles UC, CC and LC as shown in FIG. 4 may be displayed on the output interface 370 of other user equipments 130-n located within a predetermined distance from the user equipment 130-1, and a corresponding user may transmit the chat room participation request to the SNS server 110 by moving the circle CC in the middle into the lower circle LC indicated as "Join" while touching the circle CC (by 'drag and drop'). In addition, when a predetermined time (e.g., three to five seconds) elapses after the user has moved the circle CC in the middle into the upper circle UC indicated as "Lead" as shown in FIG. 5 at the user equipment 130-1 which has transmitted the chat room creation request, an SNS chat room creation screen as shown in FIG. 6 may be displayed, and the user equipments which have transmitted chat room participation requests may be displayed on the display 390 in the shape of dotted lines DL. Moreover, the SNS server 110 may create the SNS chat room for the user equipment 130-1 which has transmitted the chat room creation request and for the user equipments 130-n which have transmitted the chat room participation request to participate in the chat room, and the user equipment 130-1 which has transmitted the chat room creation request and the user equipments 130-n which have transmitted the chat room participation request may exchange text, images, moving images, emotional conditions of the users, intentions of the users and the like as messaging signals. In one embodiment, the user equipments participating in the chat room may be displayed in the upper half circle UHC of the display 390 shown in FIG. 7, and the user equipments that do not participate in the chat room may be displayed outside the upper half circle UHC. Furthermore, the user equipment 130-1 which has transmitted the chat room creation request may withdraw a specific user out of the chat room by selecting the corresponding user among the users participating in the chat room and moving the user out of the upper half circle UHC and may cause a specific user to be involved in the chat room by selecting a corresponding user among the users located outside the upper half circle UHC and moving the user into the upper half circle UHC. In conventional SNS applications, a group chat room including corresponding users can be created only when all the users exchange phone numbers with one another and each of the users registers the other users as friends, whereas according to an embodiment of the present disclosure, an SNS chat room based on the position of a user equipment can be created by only one operation of a specific user regardless of the number of users. According to an embodiment of the present disclosure, exchange of personal information such as a phone number, an e-mail address and the like between users to create a chat room can be omitted.

Figure 8:
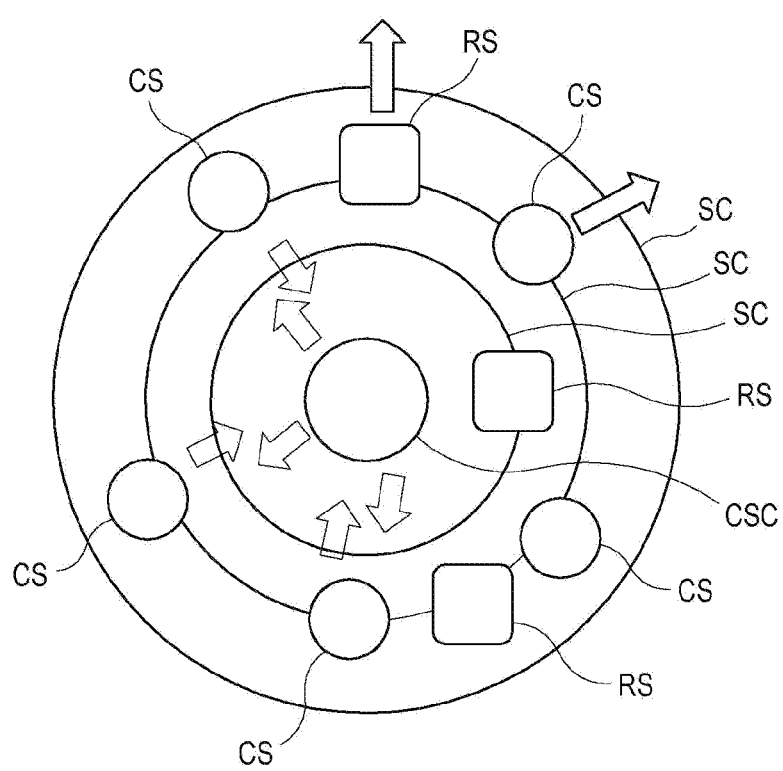
FIG. 8 is a view showing a Look Around screen for creating an SNS chat room displayed on an output interface of a user equipment, according to an embodiment of the present disclosure.

FIG. 8 is a view showing a Look Around screen for creating the SNS chat room displayed on an output interface of the user equipment, according to an embodiment of the present disclosure.

As shown in FIG. 8, when a Look Around menu (see FIG. 9) is selected at the specific user equipment 130-1, the user equipment 130-1 may transmit position information to the SNS server 110, and the SNS server 110 may transmit information on the user equipments, which are located within a predetermined distance (e.g., 1 km, 10 km, 100 km, 200 km or the like) from the corresponding user equipment 130-1, to the corresponding user equipment 130-1. The user equipment 130-1 that has received the information on the neighboring user equipments may display the neighboring user equipments in circular shapes CS and display the group chat room created in the method described with reference to FIGS. 4 to 7 in square shapes RS based on the position of the user equipment 130-1. Moreover, the distance from the user equipment 130-1 to the neighboring user equipments 130-n or to the user equipments 130-n which have transmitted the chat room creation request may be displayed using a plurality of concentric circles SC, and the profile of the user using the user equipment 130-1 may be displayed at the center of the concentric circles CSC. In addition, when the user selects a circular shape CS displayed on the output interface 370 and moves the circular shape CS to the center of the concentric circles CSC, the user may create a one-to-one chat room with a user equipment corresponding to the circular shape CS; and when the user selects a square shape RS and moves the square shape RS to the center of the concentric circles CSC, the user may participate in the group chat room corresponding to the square shape RS. In one embodiment, the number of circular shapes CS or square shapes RS which can be displayed on the output interface 370 is determined to include a certain number (e.g., twenty to fifty) of user equipments or chat rooms in the order of straight distance closer to the corresponding user equipment 130-1, among the user equipments located within a predetermined distance (e.g., 1 km, 10 km, 100 km, 200 km or the like) from the corresponding user equipment 130-1. In addition, when the user selects a circular shape CS or a square shape RS displayed on the output interface 370 and moves it to the outside of the concentric circles SC, a user equipment corresponding to the circular shape CS or a group chat room corresponding to the square shape RS may not be displayed on the output interface 370; and if all the circular shapes CS or the square shapes RS displayed on the output interface 370 are moved to the outside of the concentric circles SC, a certain number (e.g., twenty to fifty) of user equipments or group chat rooms may be displayed on the output interface 370 in the order of distance from the closest proximity to the corresponding user equipment 130-1.

Figure 9:
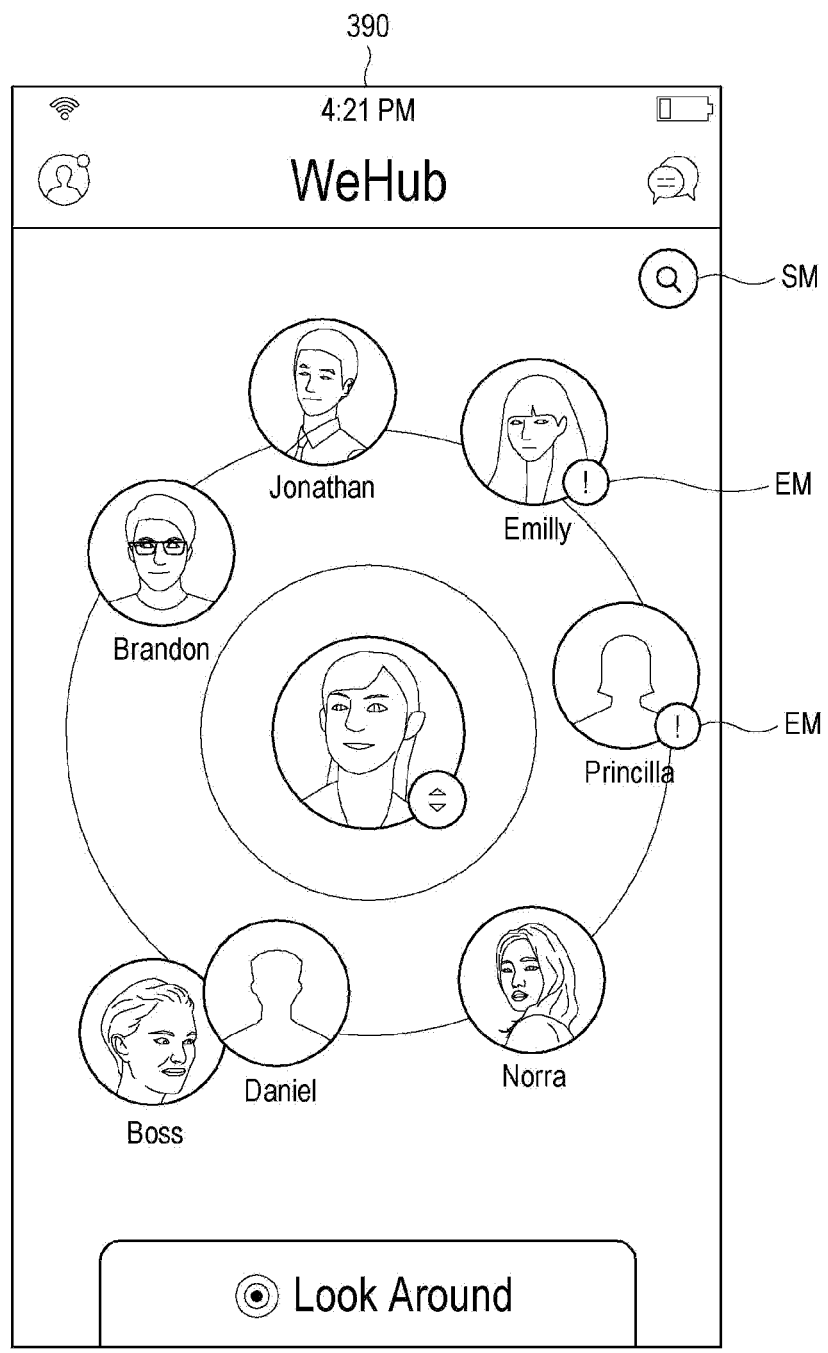
FIG. 9 is a view showing a screen for keyword matching displayed on an output interface of a user equipment, according to an embodiment of the present disclosure.

FIG. 9 is a view showing a screen for keyword matching displayed on an output interface of the user equipment, according to an embodiment of the present disclosure.

As shown in FIG. 9, the SNS application user may select a search menu SM from the Look Around screen on the display 390 for creating the SNS chat room and then input a keyword of interest (e.g., "mountain"). The SNS server 110 that has received information on the keyword input by the user may transmit information on the user equipment 130-n, which has input the same keyword "mountain" among the user equipments 130-n located within a predetermined distance (e.g., 1 km, 10 km, 100 km, 200 km or the like) from the corresponding user equipment 130-1 based on the position information of the user equipment 130-1 which has input the keyword, so that the transmitted information may be displayed in the form of an exclamation mark EM.

Figure 10:
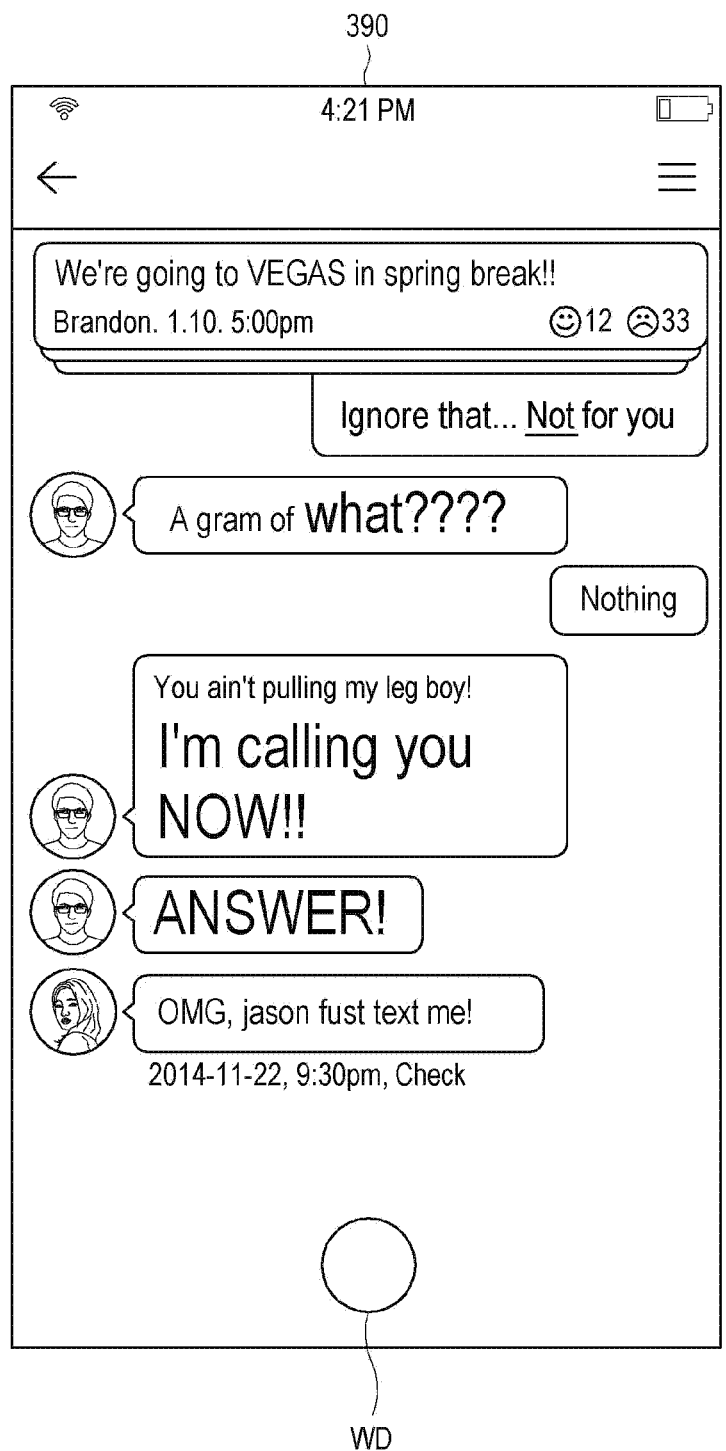
FIGS. 10 and 11 are views showing a moving image photographing function in an SNS chat room, according to an embodiment of the present disclosure.
Figure 11:
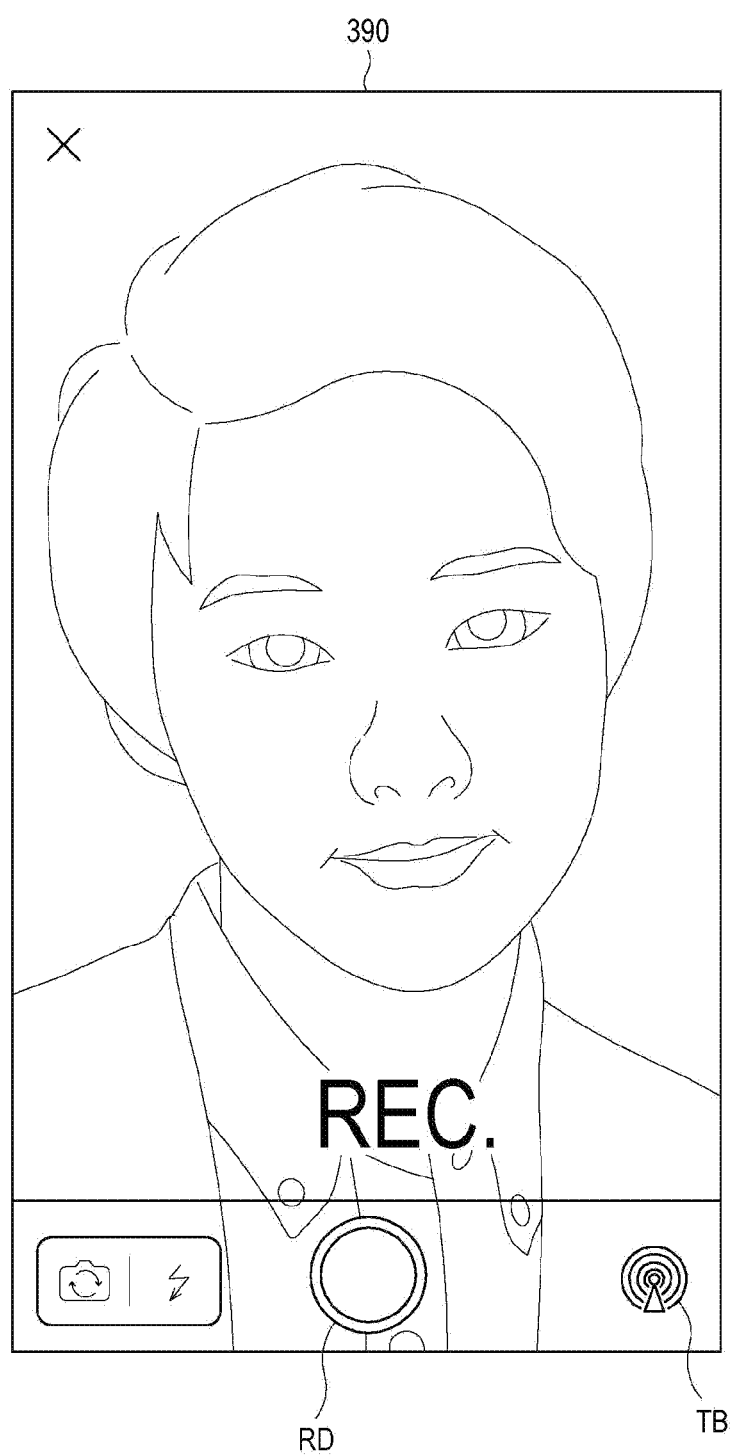

FIGS. 10 and 11 are exemplary views showing the moving image photographing function in the SNS chat room, according to an embodiment of the present disclosure.

As shown in FIG. 10, when the user presses a moving image photographing mode button WD at a lower portion of the display 390 for a predetermined time (e.g., two to three seconds) or more in the SNS chat room, the display 390 may be switched to a video recording mode as shown in FIG. 11. In the video recording mode, video is recorded and stored in the corresponding user equipment 130-1 so far as a recording button RD is pressed, and when a transmission button TB is selected, a moving image file stored in the user equipment 130-1 may be transmitted to the SNS server 110. The moving image file stored in the SNS server 110 may be confirmed in the form of a moving image, e.g., a thumbnail, in real-time by using a method such as streaming or the like at the user equipments 130-n participating in the SNS chat room including the user equipment 130-1. A moving image can be easily photographed in the SNS chat room and transmitted to a counterpart user in this manner, and this may substitute for the function of an emoticon or a sticker among SNS functions.

Figure 12:
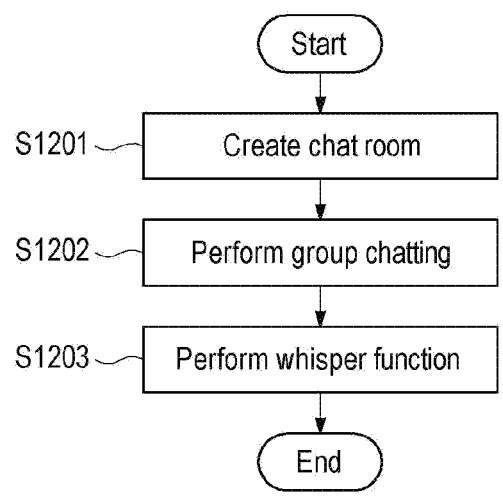
FIG. 12 is a view showing a procedure of performing a function capable of selecting only a specific user and chatting with the user in an SNS chat room, according to an embodiment of the present disclosure.

FIG. 12 is a view showing a procedure of performing a function capable of selecting only a specific user and chatting with the user in the SNS chat room, according to an embodiment of the present disclosure.

As shown in FIG. 12, when the SNS application is driven in the user equipment 130-1, a chatting counterpart list can be confirmed, and the SNS chat room can be created by selecting a desired chatting counterpart (step S1201). In another embodiment, the SNS chat room can be created using a method of creating the SNS chat room based on the position of the user equipment 130-1 described with reference to FIGS. 4 to 8. The user may perform group chatting at the user equipment 130-1 (step S1202). Particularly, the user may perform one-to-one chatting by selecting only a specific counterpart from the chatting counterpart list or may perform group chatting if another user is invited while performing one-to-one chatting. When the group chatting is performed, the user may perform a so-called whisper function of selecting at least one user among the users participating in the group chatting and separately chatting with the user (step S1203). The use of the whisper function enables an SNS message to be transmitted only to the at least one user selected among the users participating in the group chatting.

Figure 13:
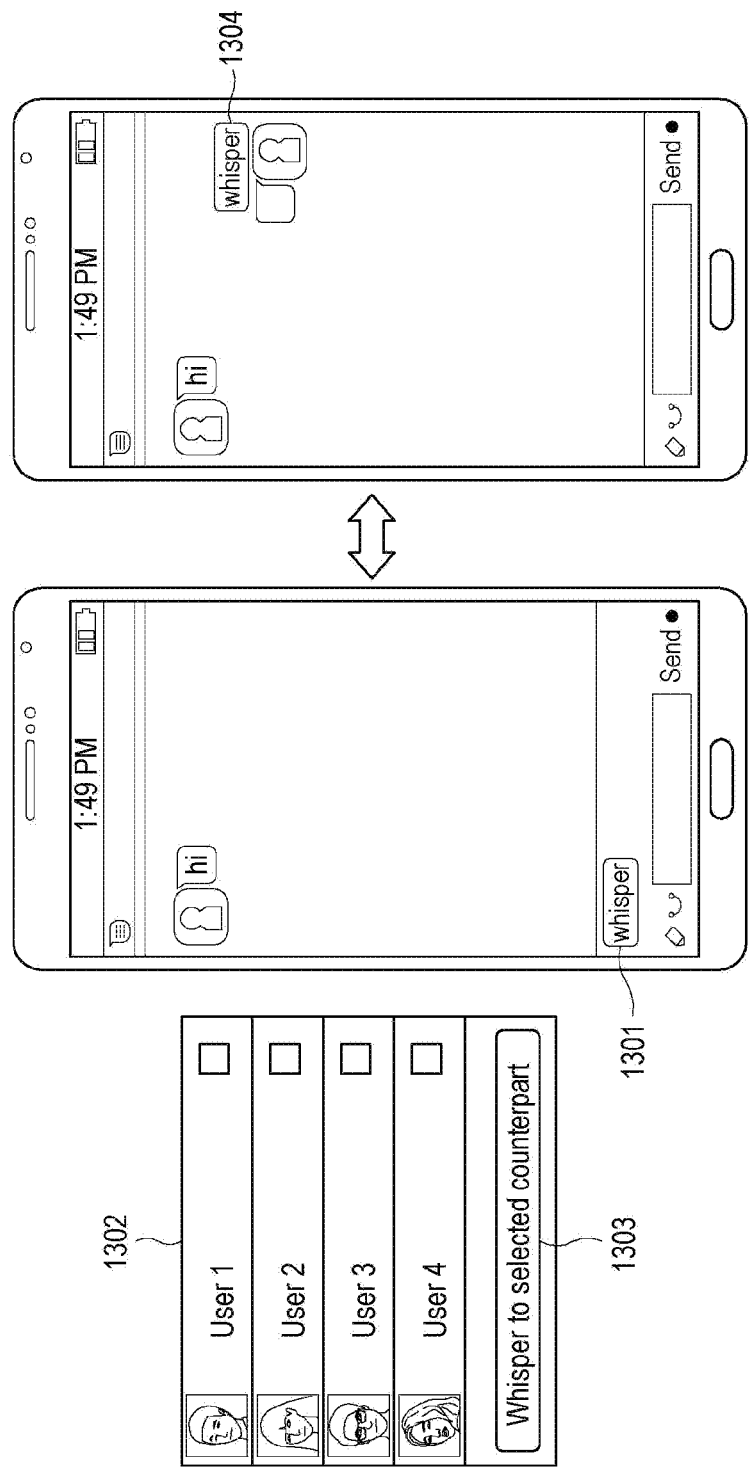
FIG. 13 is a view showing a user interface for a whisper function in an SNS chat room, according to an embodiment of the present disclosure.

FIG. 13 is a view showing a user interface for the whisper function in the SNS chat room, according to an embodiment of the present disclosure.

As shown in FIG. 13, when the whisper function is selected in the SNS chat room for group chatting, a list of users 1302 participating in the group chatting can be displayed. When specific users are selected from the list of group chatting users and a whisper function performing button 1303 is selected, "whisper" 1304 indicating the whisper function may be displayed in messages transmitted and received using the whisper function.

Figure 14:
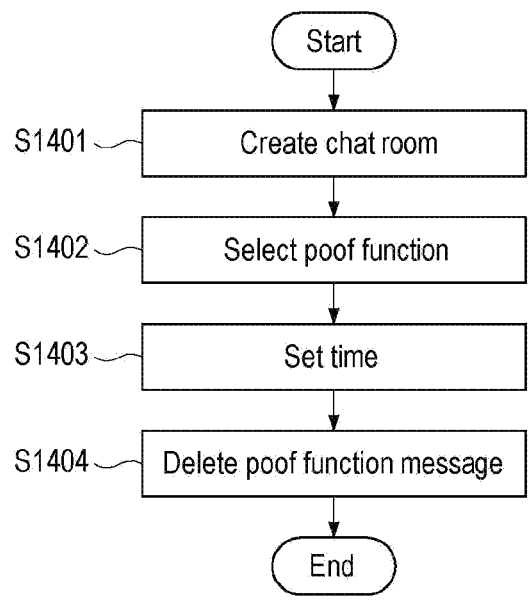
FIG. 14 is a view showing a procedure of performing a function capable of deleting a specific message in an SNS chat room, according to an embodiment of the present disclosure.

FIG. 14 is an exemplary view showing a procedure of performing a function capable of deleting a specific message in an SNS chat room, according to an embodiment of the present disclosure.

As shown in FIG. 14, when the SNS application is driven in the user equipment 130-1, the chatting counterpart list can be confirmed, and the SNS chat room can be created by selecting a desired chatting counterpart (step S1401). In another embodiment, the SNS chat room may be created using a method of creating the SNS chat room based on the position of the user equipment 130-1 described with reference to FIGS. 4 to 8. The user may select a so-called poof function at the user equipment 130-1 to cause a message to automatically disappear after a predetermined time elapses, upon transmission of the message in the chat room (step S1402) and may set, by way of user input, a time for sustaining the message until the message with the poof function applied thereto is deleted after the message is confirmed at the counterpart user equipment 130-n (step S1403). When a request for transmitting a message with the poof function applied thereto is received, the SNS server 110 may delete the corresponding message from the counterpart user equipment 130-n and/or the SNS server 110 when a predetermined time elapses after the message with the poof function applied thereto is confirmed at the counterpart user equipment 130-n (step S1404). In this case, the corresponding message may be deleted even from the user equipment 130-1.

Figure 15:
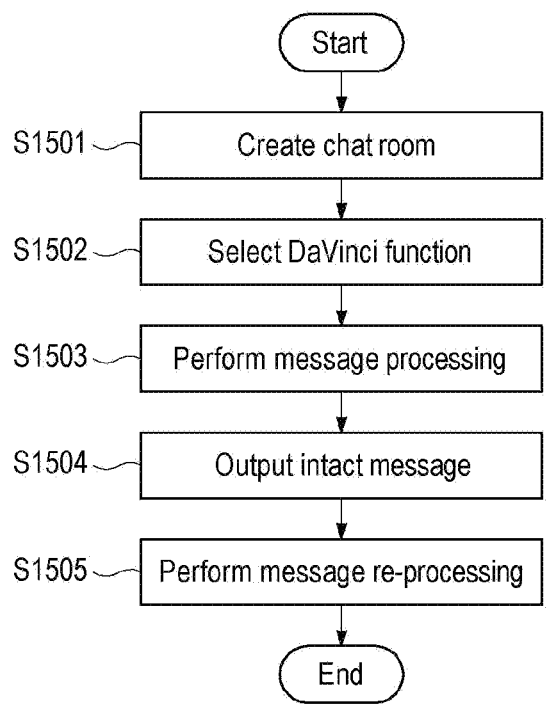
FIG. 15 is an exemplary view showing a procedure of performing a function capable of reinforcing security of a specific message in an SNS chat room, according to an embodiment of the present invention.

FIG. 15 is a view showing a procedure of performing a function capable of reinforcing security of a specific message in an SNS chat room, according to an embodiment of the present disclosure.

Figure 16:
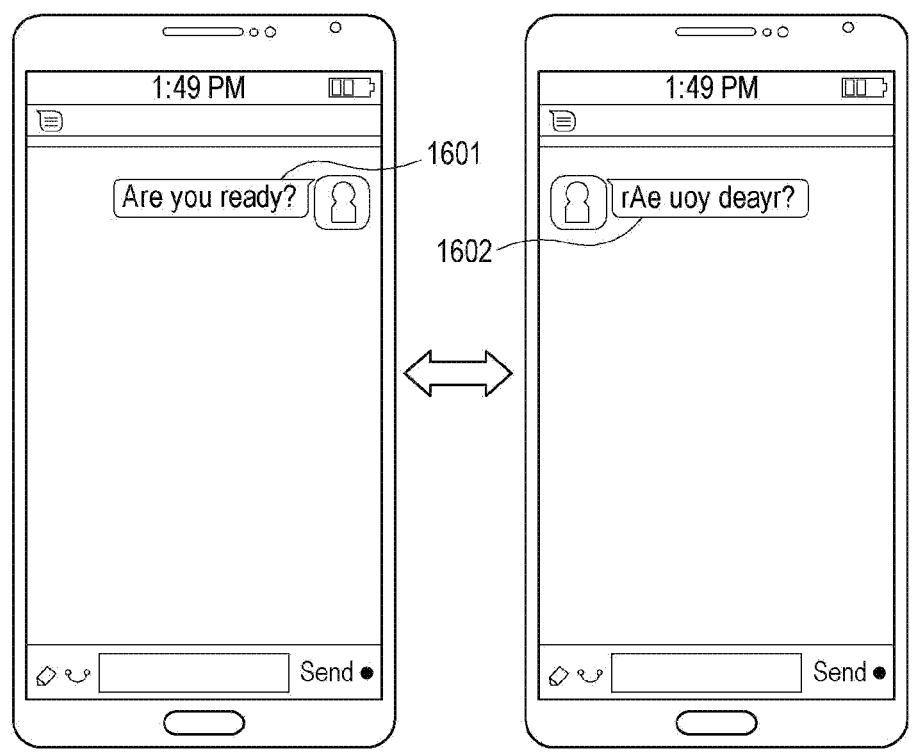
FIG. 16 is a view showing a message with a DaVinci function applied thereto in an SNS chat room, according to an embodiment of the present disclosure.

As shown in FIG. 15, when the SNS application is driven in the user equipment 130-1, the chatting counterpart list can be confirmed, and the SNS chat room can be created by selecting a desired chatting counterpart (step S1501). In another embodiment, the SNS chat room may be created using a method of creating the SNS chat room based on the position of the user equipment 130-1 described with reference to FIGS. 4 to 8. The user may select a DaVinci function at the user equipment 130-1 to reinforce security of a message by encrypting the message upon transmission of the message in the chat room (step S1502). The SNS server 110 may transmit the message with the DaVinci function applied thereto to a counterpart user equipment after processing the message by randomly arranging text on a syntactic word basis and randomly arranging images on a pixel basis and performing mosaic processing for hiding a specific portion of a moving image or performing blur effect processing for blurring a specific portion of the moving image (step S1503). When the message with the DaVinci function applied thereto is confirmed at the counterpart user equipment, an intact message is output (step S1504) so that the user may confirm the message; and when a predetermined time (e.g., ten to twenty seconds) elapses after the message is confirmed, the text and the images are randomly arranged on the syntactic word and pixel basis, respectively, and re-processing such as mosaic or blur effect processing is performed on the moving image (step S1505) so that an intact message may not be confirmed. In FIG. 16, reference numeral 1601 represents an intact text image, and reference numeral 1602 represents a text message with the DaVinci function applied thereto.

Figure 17:
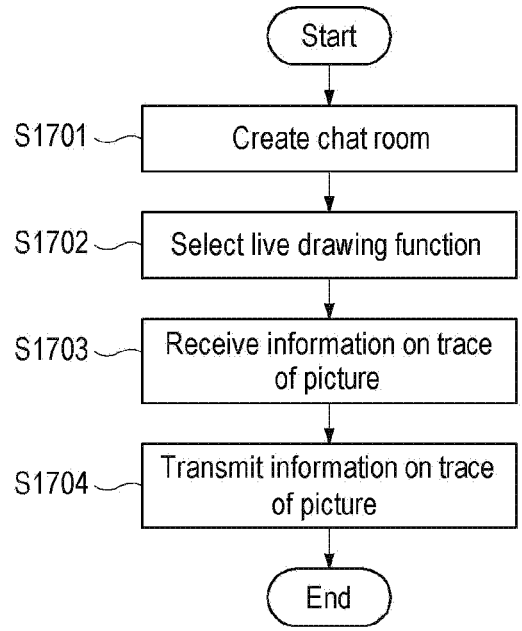
FIG. 17 is a view showing a procedure of performing a live drawing function capable of drawing a picture in real-time together with a counterpart user in an SNS chat room, according to an embodiment of the present disclosure.

FIG. 17 is a view showing a procedure of performing a live drawing function capable of drawing a picture in real-time together with counterpart users in the SNS chat room, according to an embodiment of the present disclosure.

As shown in FIG. 17, when the SNS application is driven in the user equipment 130-1, the chatting counterpart list can be confirmed, and the SNS chat room can be created by selecting a desired chatting counterpart (step S1701). In another embodiment, the SNS chat room may be created using a method of creating the SNS chat room based on the position of the user equipment 130-1 described with reference to FIGS. 4 to 8. The user may select a live drawing function in the chat room at the user equipment 130-1 (step S1702). When the user draws a picture at the user equipment using the live drawing function, the SNS server 110 may receive information on a trace of the picture (step S1703) and transmit information on the corresponding trace to the counterpart user equipments 130-*n* (step S1704) so that the same picture may appear on a plurality of remotely positioned user equipments 130-*n*.

Figure 18:
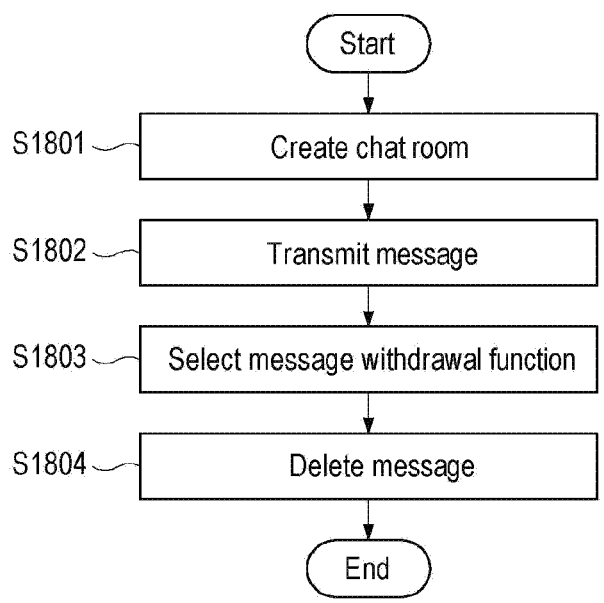
FIG. 18 is a view showing a procedure of performing a message recall function in an SNS chat room, according to an embodiment of the present disclosure.

FIG. 18 is a view showing a procedure of performing a message recall function in an SNS chat room, according to an embodiment of the present disclosure.

As shown in FIG. 18, when the SNS application is driven in the user equipment 130-1, the chatting counterpart list can be confirmed, and the SNS chat room can be created by selecting a desired chatting counterpart (step S1801). In another embodiment, the SNS chat room may be created using a method of creating an SNS chat room based on the position of the user equipment 130-1 described with reference to FIGS. 4 to 8. The user may transmit a message to a counterpart user equipment 130-*n* at the user equipment 130-1 (step S1802) and may select a specific message after transmitting the message and then select a message recall function (step S1803). When a message recall request is received from the specific user equipment 130-1, the SNS server 110 may delete the corresponding message from the counterpart user equipment 130-*n* and the SNS server 110 (step S1804).

An emotional signature (eMo) technique according to an embodiment of the present disclosure allows the SNS server 110 to digitize various emotional conditions of an SNS user and to transfer them to a counterpart user. In order to digitize various emotional conditions of the user, the user equipment 130-1 can be used to analyze the body temperature, blood flow, heartbeat, moisture of the skin, loudness of a voice, trembling of a voice, typing pattern, image pattern, video pattern and the like of the user. Further, in order to digitize an emotional condition of a user, it is possible to use at least one active method of directly inputting an emotional condition by the user using the user equipment 130-1 and one passive method of sensing an emotional condition of the user by the user equipment 130-1. In one embodiment, as one of the passive methods, a heartbeat rate per minute of the user can be measured using a heartbeat rate measurement sensor attached to the user equipment 130-1. A heartbeat rate of the user between forty and sixty may show a stable state (e.g., an emotional condition of comfort, pleasure or the like), a heartbeat rate between sixty and seventy may show a slightly excited state (e.g., an emotional condition of love, enjoyment or the like) and a heartbeat rate between seventy and one hundred may show an extremely excited state (e.g., an emotional condition of anger or the like). In another embodiment, as one of the passive methods, an emotional condition of the user can be digitized according to how many times a specific word has been used while the user exchanges messages with a counterpart. For example, if the word "love" has been used a predetermined number of times (e.g., five to ten times) while transmitting and receiving messages, an emotional condition of love can be expressed through a big data analysis. In another embodiment, as one of the passive methods, if a face included in an image is recognized as smiling, an emotional condition of pleasure may be expressed, or if the face is recognized as frowning, an emotional condition of anger may be expressed. In another embodiment, if a voice input by the user through the user equipment 130-1 is not greater than a predetermined level (e.g., 10 to 15 dB), a stable emotional condition may be expressed, and if the voice is not less than a predetermined level (e.g., 25 to 35 dB), an excited (angered) emotional condition (anger) may be expressed.

In one embodiment, the SNS server 110 may express an emotional condition in a circular shape (see "C" of FIG. 19) or the like blinking at an end of an SNS message, an image, a moving image, text or the like by using digitized emotional condition data (e.g., love, pleasure, anger or the like) of the user. The emotional condition may be expressed in a triangular or square shape instead of the circular shape. In addition, the expressed emotional condition may reflect the emotional condition of the user changing in real-time.

The SNS providing environment 100, i.e., the SNS server 110 and the user equipments 130-1 to 130-*n*, may share the digitized emotional condition of the user. That is, a specific user equipment 130-1 may measure an emotional condition of a user, transmit a corresponding measurement value of the emotional condition of the user to the SNS server 110 to be stored therein, and transmit the digitized emotional condition of the user to other user equipments 130-*n* connected through the network 120. The SNS server 110 may perform various signal processing such as analysis, statistics and the like using the digitized emotional condition data of the user received from the user equipments 130-1 to 130-*n*.

In addition, a specific user equipment 130-1 may transmit a measurement value of an emotional condition of a user to other user equipments 130-*n* connected using the network 120 without passing through the SNS server 110. In one embodiment, the user equipments 130-1 to 130-*n* may include various smart devices such as a personal computer, a tablet, a smart phone, a notebook computer, a personal digital assistant (PDA) and the like. In one embodiment, the SNS server 110 may store the digitized emotional condition of a user together with and incorporated into data of an SNS message, an image, a moving image, text or the like or separately from an SNS message data, an image, a moving image, text or the like.

Figure 19:
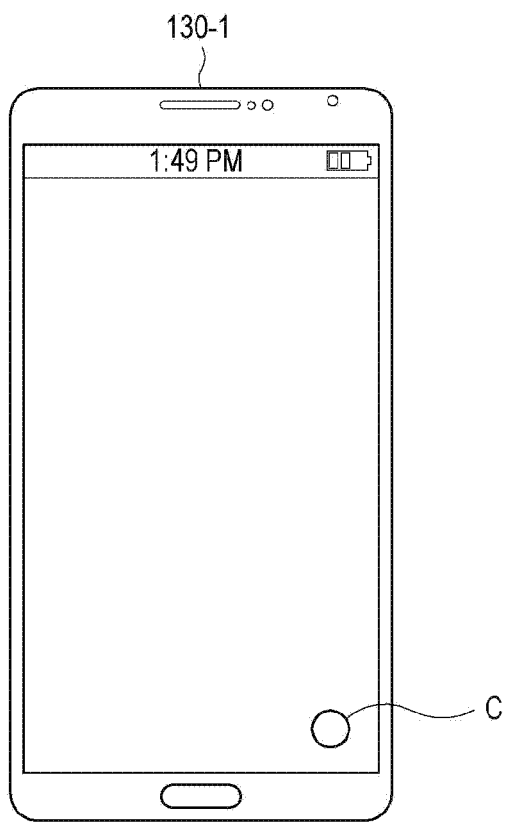
FIGS. 19 to 25 are views showing an emotional signature displayed on various media, according to an embodiment of the present disclosure.
Figure 20:
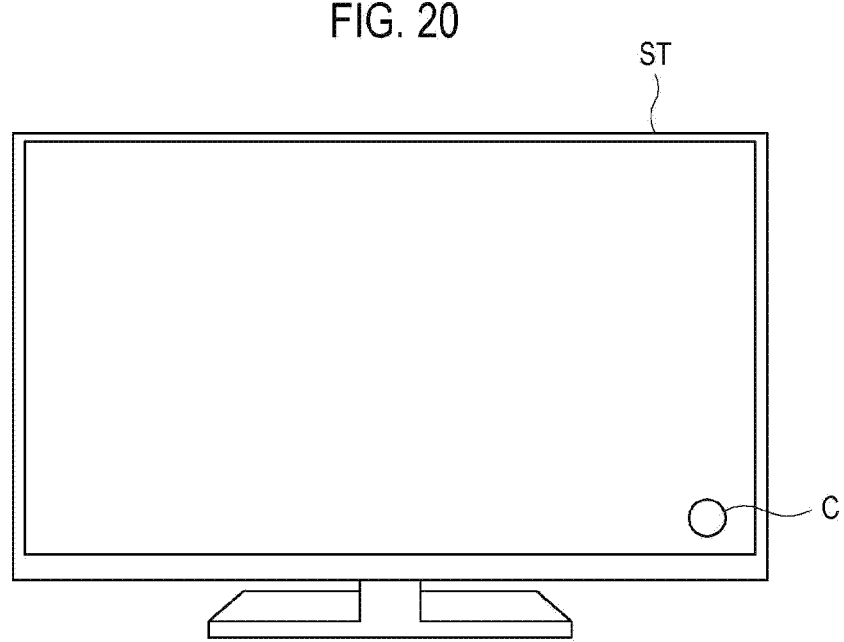
Figure 21:
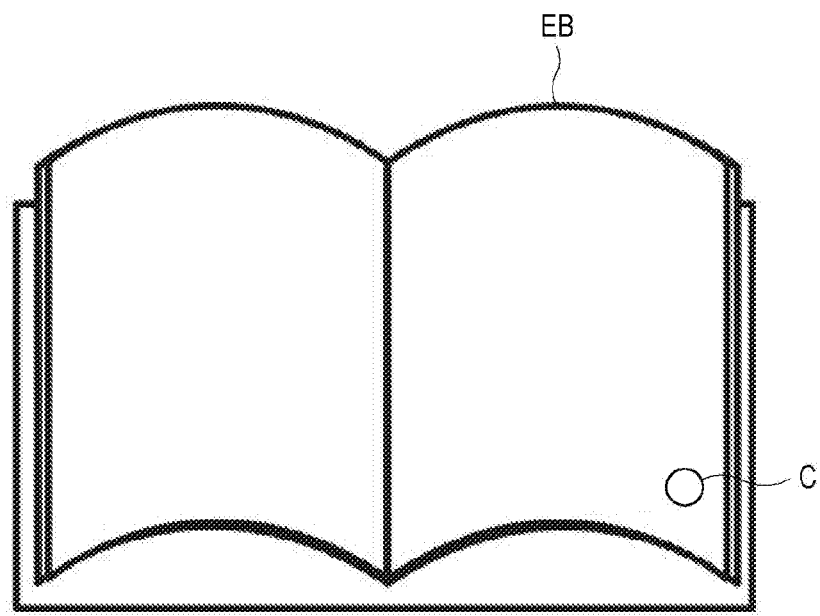
Figure 22:
Figure 23:
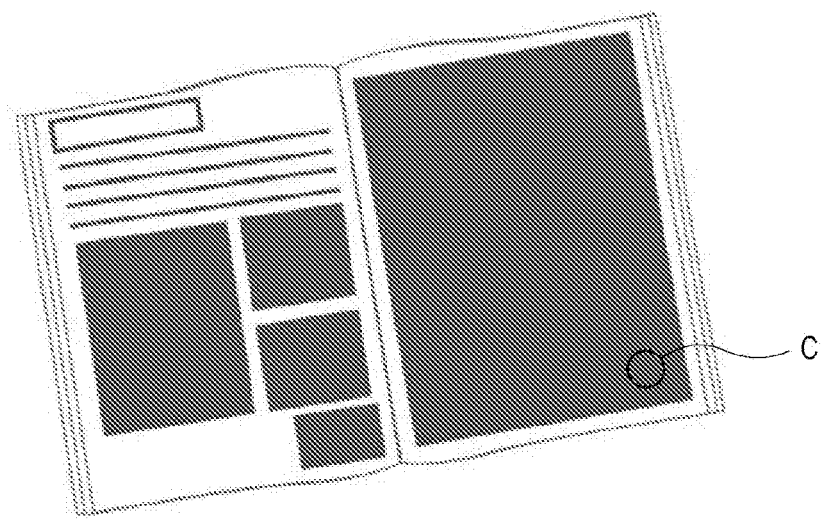
Figure 24:
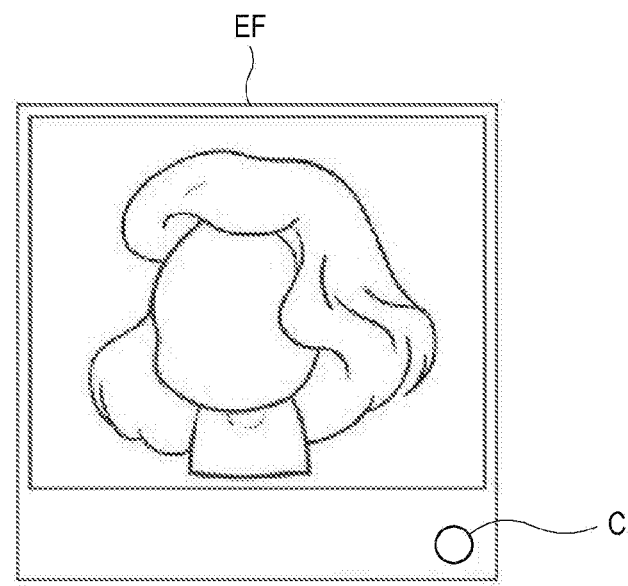
Figure 25:
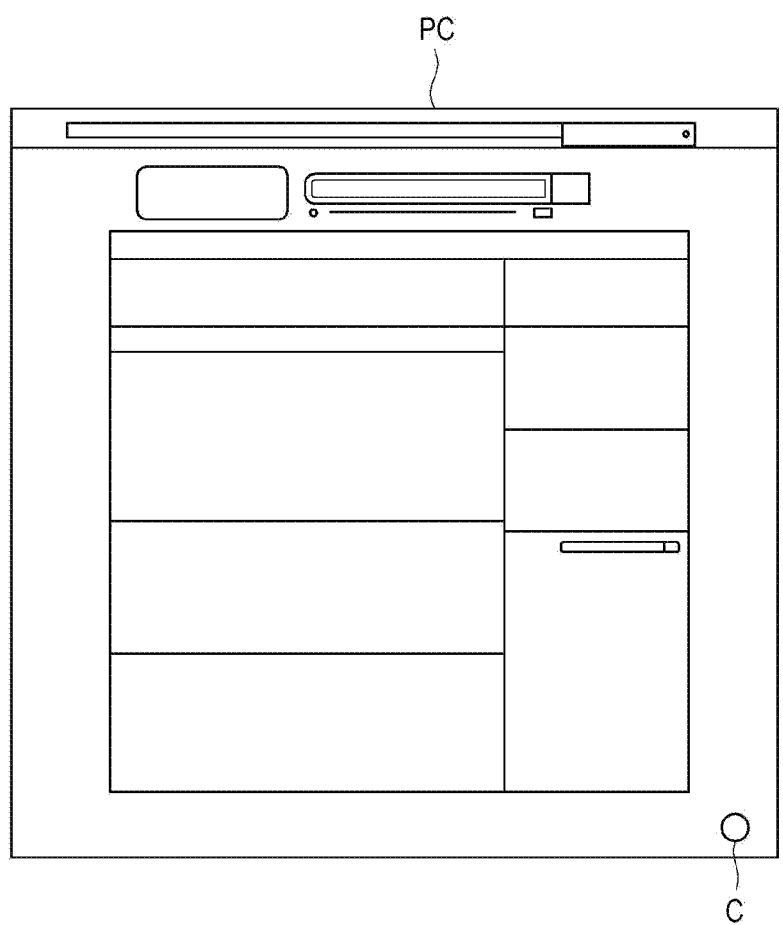

FIGS. 19 to 26 are views showing an emotional signature displayed on a variety of media, according to an embodiment of the present disclosure. FIG. 19 shows an emotional signature displayed in a circular shape C on the user equipment 130-1 such as a smart phone or the like. Such an emotional signature may be used to express an emotion by the user himself/herself even during general use of the user equipment 130-1 (e.g., calling, web surfing or the like), may be transmitted together upon transmission of a message in the SNS chat room as shown in FIG. 10, and may be transmitted together with a moving image even upon transmission of the moving image as shown in FIG. 11, but it is not limited thereto. FIG. 20 shows an emotional signature expressed in a circular shape C on a smart television set ST, FIG. 21 shows an emotional signature expressed in a circular shape C on an electronic book EB, FIG. 22 shows an emotional signature expressed in a circular shape C on an electronic newspaper EN, FIG. 23 shows an emotional signature expressed in a circular shape C on an electronic magazine E-M, FIG. 24 shows an emotional signature expressed in a circular shape C on an electronic picture frame EF, and FIG. 25 shows an emotional signature expressed in a circular shape C on a web page of a personal computer PC.

Figure 26:
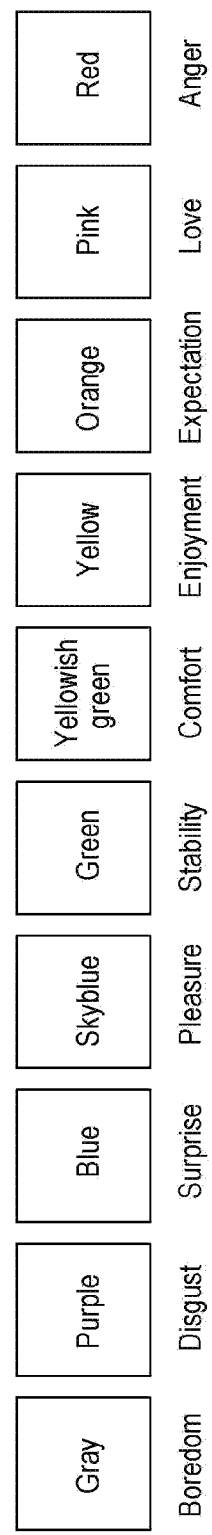
FIG. 26 is a view showing corresponding colors for expressing emotional signatures of a user, according to an embodiment of the present disclosure.

FIG. 26 is a view showing responsive colors for expression emotional signatures of a user, according to an embodiment of the present disclosure.

As shown in FIG. 26, the SNS server 110 may store the emotional condition of the user by mapping boredom to gray, disgust to purple, surprise to blue, pleasure to sky-blue, stability to green, comfort to yellowish green, enjoyment to yellow, expectation to orange, love to pink and anger to red. Further, when the SNS server 110 receives the digitized emotional signature of the user, it may display a color mapped to the corresponding emotional signature at an end of an SNS message, an image, a moving image, text or the like, for example, in a circular shape (see "C" of FIG. 25).

While the foregoing methods have been described with respect to particular embodiments, these methods may also be implemented as computer-readable codes on a computer-readable recording medium. The computer-readable recoding medium includes any kind of data storage devices that can be read by a computer system. Examples of the computer-readable recording medium include ROM, RAM, CD-ROM, magnetic tape, floppy disk, optical data storage device and the like, and also include that implemented in the form of a carrier wave (e.g., transmission via Internet). Also, the computer-readable recoding medium can be distributed to the computer systems which are connected via a network so that the computer-readable codes can be used and executed thereon. Further, the functional programs, codes, and code segments for implementing the foregoing embodiments can easily be inferred by the programmers in the art to which the present disclosure pertains.

Although embodiments have been described with reference to a number of illustrative embodiments thereof, it should be understood that numerous other modifications and embodiments can be devised by those skilled in the art that will fall within the spirit and scope of the principles of this disclosure. Furthermore, numerous variations and modifications are possible in the component parts and/or arrangements of the subject combination arrangement within the scope of the appended claims.

What is claimed is:

1. A method for indicating an emotional condition of a first user to a second user, comprising:
   generating a message by the first user;
   sensing the emotional condition of the first user, including measuring a heartbeat of the first user with a sensor to generate a measurement value corresponding to the emotional condition;
   digitizing the emotional condition by analyzing the measurement value to be in one of a plurality of predetermined ranges of measurement values, with each range mapped to one of a plurality of emotional conditions to generate a corresponding emotional signature in the form of a blinking geometric shape at the end of the message, wherein the predetermined ranges include a heartbeat rate of the user between forty and sixty corresponding to a first emotional condition, a heartbeat rate between sixty and seventy corresponding to a second emotional condition, and a heartbeat rate between seventy and one hundred corresponding to a third emotional condition;
   transferring the message and the emotional signature to the second user;
   and outputting the emotional signature as the blinking geometric shape at the end of the message to the second user, thereby indicating the emotional condition of the first user to the second user.

2. The method of claim 1, wherein the sensing is performed by a user equipment associated with the first user as the sensor.

3. The method of claim 1, wherein the digitizing is performed by a server.

4. The method of claim 1, wherein each of the first and second users is associated with a respective user equipment; and
   wherein the transferring is performed by a server in communication with the user equipments of the first and second users.

5. The method of claim 1, wherein the sensed emotional condition represents the emotional condition of the first user changing in real-time.

6. The method of claim 1, wherein the outputting is performed by a user equipment associated with the second user.

7. The method of claim 6, wherein the user equipment is selected from a smartphone, a tablet, a smart television set, an electronic book, an electronic newspaper, an electronic picture frame, a personal computer, and an electronic appliance with network communication capabilities.

8. The method of claim 6, wherein the user equipment outputs the emotional signature by displaying, to the second user, the blinking geometric shape at the end of the message corresponding to the emotional condition of the first user.

9. The method of claim 8, wherein the user equipment displays a chat room with the message and the blinking geometric shape associated therewith.

10. A method for indicating an emotional condition of a first user to a second user, comprising:
    generating a message by the first user through a user interface using a Social Network Service (SNS) application;
    sensing the emotional condition of the first user, including measuring heartbeat of the first user with a sensor to generate a measurement value corresponding to the emotional condition;
    digitizing the emotional condition by analyzing the measurement value to be in one of a plurality of predetermined ranges of measurement values, with each range mapped to one of a plurality of emotional conditions to generate a corresponding emotional signature in the form of a blinking geometric shape at the end of the message, wherein the predetermined ranges include a heartbeat rate of the user between forty and sixty corresponding to a first emotional condition, a heartbeat rate between sixty and seventy corresponding to a second emotional condition, and a heartbeat rate between seventy and one hundred corresponding to a third emotional condition;
    transferring the message and the emotional signature to the second user;
    and outputting the message and the emotional signature as the blinking geometric shape at the end of the message to the second user, thereby indicating the emotional condition of the first user to the second user.

11. The method of claim 10, wherein the outputting is performed by a user equipment associated with the second user.

12. The method of claim 11, wherein the user equipment outputs the emotional signature by displaying, to the second user, the blinking geometric shape at the end of the message corresponding to the emotional condition of the first user.

13. The method of claim 12, wherein the user equipment displays a chat room with the message and the blinking geometric shape associated therewith.

14. A method for indicating an emotional condition of a first user to a second user, comprising:
    receiving, at a first user equipment associated with the first user, a user request;

generating an app driving signal in response to the user request;
driving a Social Network Service (SNS) application on the first user equipment;
outputting a user interface on the first user equipment;
outputting the SNS application through the user interface;
generating a messaging signal in response to the user request;
generating a message using the messaging signal;
outputting the message to the first user through the user interface using the SNS application;
sensing the emotional condition of the first user, including measuring a heartbeat of the first user with a sensor to generate a measurement value corresponding to the emotional condition;
digitizing the emotional condition by analyzing the measurement value to be in one of a plurality of predetermined ranges of measurement values, with each range mapped to one of a plurality of emotional conditions to generate a corresponding emotional signature in the form of an animated geometric shape at the end of the message, wherein the predetermined ranges include a heartbeat rate of the user between forty and sixty corresponding to a first emotional condition, a heartbeat rate between sixty and seventy corresponding to a second emotional condition, and a heartbeat rate between seventy and one hundred corresponding to a third emotional condition;
transferring the message and the emotional signature to the second user; and
outputting the message and the emotional signature as the animated geometric shape at the end of the message to the second user, thereby indicating the emotional condition of the first user to the second user.

15. The method of claim 14, wherein the outputting is performed by a user equipment associated with the second user.

16. The method of claim 15, wherein the user equipment outputs the emotional signature by displaying, to the second user, the animated geometric shape at the end of the message corresponding to the emotional condition of the first user.

17. The method of claim 16, wherein the user equipment displays a chat room with the message and the animated geometric shape associated therewith.

\* \* \* \* \*